United States Patent
Bernett et al.

[15] 3,706,696
[45] Dec. 19, 1972

[54] GROUTING COMPOSITION

[72] Inventors: Frank E. Bernett, Yardley, Pa.;
Robert J. Kleinhans, Kingston, N.J.

[73] Assignee: Tile Council of America, Inc., New York, N.Y.

[22] Filed: Jan. 8, 1971

[21] Appl. No.: 105,068

Related U.S. Application Data

[63] Continuation-in-part of Ser. No. 732,081, May 27, 1968, abandoned.

[52] U.S. Cl.....260/29.7 E, 260/29.6 S, 260/29.6 PS, 260/29.6 E, 260/29.7 S
[51] Int. Cl. ......C04b 19/02, C08d 7/00, C08f 29/00
[58] Field of Search.......260/29.6 PS, 29.7 S, 29.7 E, 260/29.6 S, 29.6 E

[56] References Cited

UNITED STATES PATENTS 2,986,544   5/1961   Driscoll..........................260/29.7 S
3,239,479   3/1966   Boenicke et al..................260/29.7 S

*Primary Examiner*—Allan Lieberman
*Attorney*—Morgan, Finnegan, Durham & Pine

[57] ABSTRACT

A novel and improved grouting composition is provided having a viscosity of 50,000 to 1,200,000 cps., a water retention value of 10 to 40, a filler content of from about 75 to 88 percent and a volatile component content of from 8 percent to 20 percent which comprises an admixture of a water resistant polymer emulsion having a solids content of at least 40 percent and a non-hydraulic water insoluble filler having an average particle size not greater than 100 mesh nor less than 20 microns, which when measured as an aqueous slurry, at a viscosity of between 400,000 to 500,000 cps., has a water to filler volume ratio not greater than one and a slurry flow not greater than 120 percent. Additionally, a method of setting and grouting tile is provided in which said novel composition is employed.

8 Claims, No Drawings

GROUTING COMPOSITION

CROSS-REFERENCE TO RELATED APPLICATIONS

This application is a continuation-in-part application of U.S. application Ser. No. 732,081 filed May 27, 1968, now abandoned.

BACKGROUND OF THE INVENTION

Generally stated, the subject matter of the present invention relates to a mastic grouting composition. More particularly, the invention relates to preconstituted grouting and pointing composition comprising an admixture of water resistant polymer emulsion and suitable water insoluble filler.

Conventional grouting and pointing compositions usually comprise Portland cement and require reconstitution just prior to use. Such compositions possess the advantages of ease of cleaning from a tile surface, as well as permanency, non-toxicity and inertness. Therefore, the conventional Portland cement grouting compositions enjoy a wide acceptance in spite of inherent disadvantages such as a short pot life, that is, the period of time in which the reconstituted compositions begin to harden, permeability, staining, and a high incidence of discoloration among others.

Attempts to obviate these disadvantages have thus far been unsuccessful, and the improvements in the composition have resided in the incorporation of particular additives such as calcium and barium chloride to speed the cure of the composition, calcium lignin sulphonates to reduce shrinkage, stearates to reduce permeability, polyvinyl acetate to reduce brittleness, cellulose ethers to retain water needed for cure and sand and limestone to reduce shrinkage, as well as improving the bond to vitreous tile.

SUMMARY OF THE INVENTION

The present invention represents the culmination of a long series of investigations directed to obviating the inherent shortcomings of conventional grouting compositions without sacrificing the advantages of workability, ease of cleaning from a tile surface, permanency, non-toxicity, and inertness.

The objective was to prepare a grouting composition which would meet the following criteria:

workability, that is fluid enough to trowel and yet of sufficient viscosity to avoid sagging on vertical surfaces;

compaction, that is the proper compaction of the composition between the joints of the tile on curing, which is defined in terms of a high solids to water ratio thereby resulting in minimal shrinking and less cracking of the cured grouting composition. Compaction potential is usually expressed in terms of water retention value, and a grouting composition having too great a water retention value has a high rate of shrinkage and results in a high incidence of cracking. The water retention value of a composition may be determined by employing the procedure hereinafter described in Example I.

Additionally, such compositions should be capable of accommodation to both glazed and unglazed tile edges, susceptible to striking to give a sharp and properly contoured joint surface and resistance to streaking by steel tools after the joint has hardened, as well as impermeability, resistance to staining and the like.

Accordingly, it is a primary object of the present invention to provide an improved grouting composition which possesses the advantages of the conventional Portland cement composition without any of the inherent shortcomings.

Another object of the present invention is to provide a preconstituted grouting composition having the advantages of workability most frequently attributed to Portland cement compositions.

It is a further object of the present invention to provide an improved grouting composition of relative permanency, non-toxicity and inertness.

Yet another object of this invention is to overcome such inherent disadvantages of the conventional Portland cement grouting compositions as staining and permeability, as well as short pot life.

Generally then, it is an object of this invention to provide a preconstituted mastic grout which has infinite pot life, is readily applicable to dry glazed wall tile installed by the adhesive, dry-set or conventional methods, fills and consolidates in the joints between the tile, does not sag from vertical joints, cleans-up from the glazed surfaces relatively easily, loses water into absorptive bisque and by drying at the surface of the joint, and then hardens by coalescense of the polymer emulsion particles, forming a grout which is substantially more stain resistant than is ordinary Portland cement type grouts.

Additional objects and advantages of the invention will be set forth in part in the description which follows and in part will be obvious from the description, or may be realized by practice of the invention, the objects and advantages being realized and attained by means of the methods processes, instrumentalities and combinations particularly pointed out in the appended claims.

DETAILED DESCRIPTION OF THE INVENTION

To achieve the foregoing objects and in accordance with its purpose, as embodied and broadly described, the present invention relates to an improved grouting composition having a viscosity of 50,000 to 1,200,000 cps., a water retention value of from about 10 to 40, filler content of 75 to 88 percent and a volatile component content of from 8 percent to 20 percent which comprises an admixture of a water resistant polymer emulsion having a solids content of at least 40 percent with the maximum content not in excess of about 75 percent and a non-hydraulic water insoluble filler having an average particle size not greater than 100 mesh nor less than 20 microns and a viscosity of from about 400,000 to 500,000 cps. when measured in an aqueous slurry in which the water to filler volume ratio is not greater than 1, said slurry having a flow not greater than 120 percent.

The present invention further provides an improved method of grouting tile employing the aforesaid novel composition.

The invention consists of the novel methods, processes, steps and improvements shown and described.

It is to be understood that both the foregoing general description and the following detailed description are exemplary and are not restrictive of the invention.

Therefore, the present invention provides a unitary, peconstituted, nonhydraulic grouting composition which fulfills the criteria herein above set forth. The inventive concept resides in the discovery that a grouting composition can be prepared from water resistant polymer emulsions by employing a filler having particular physical properties.

While specialized filler water resistant polymer systems are available for caulking, filleting and the like, such compositions have physical properties which render them totally useless as grouting compositions. Consider caulking compositions which are employed as tub caulk, and expansion and control joint fillers, to mention but a few of their applications. Such compositions have extremely slow hardening and water loss properties, and usually retain a putty-like consistency over periods as long as several years. Additionally, such compositions have great extensibility, as well as a residual flexibility and pliability. Lastly, when the compositions have dried they are brittle and will readily crack on shrinkage or movement.

The water resistant polymer emulsions employed in the present invention usually consist of a disperse phase containing minute droplets of the polymer and an external continuous phase of water. The polymers are typically prepared by emulsion polymerization which proceeds by a free radical mechanism. The monomers are ethylenically unsaturated compounds represented by the following general formula:

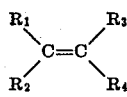

wherein $R_1$, $R_2$, $R_3$, and $R_4$ may be hydrogen, halogen, alkyl, aryl, alkylene, and the like. In most instances at least two hydrogen atoms are linked directly to the ethylenic carbon atoms and in true vinyl monomers $R_1$, $R_2$, and $R_3$ are all hydrogen.

Vinyl acetate, vinyl chloride, acrylonitrile, vinylidene chloride, styrene, butadiene, alkyl acrylate, alkyl methacrylate, alkyl maleate, and alkyl fumarate among others are illustrative of monomers from which water resistant polymer emulsions found useful in the present invention have been prepared.

The resulting polymers may be homopolymeric or copolymeric. They may be straight chained or branched. The present invention contemplates polymers obtained from the aforesaid monomers, mixtures and derivatives thereof.

The following list of polymers suitable for use herein is only representive of the many kinds which find application:
 polyvinyl acetate
 polyvinyl chloride
 polystyrene
 polybutadiene
 polymethyl acrylate
 styrene-dimethyl maleate copolymer
 styrene-dimethyl fumarate copolymer
 styrene-butadiene copolymer
 butadiene-maleic anhydride copolymer
 methylmethacrylate -acrylic acid copolymer
 ethyl acrylate - methacrylic acid copolymer
 vinyl chloride - ethyl acrylate copolymer
 vinyl chloride - acrylic acid copolymer
 ethylacrylate - acrylic acid copolymer
 methylmethacrylate - acrylic acid copolymer
 styrene - diethylmaleate copolymer
 vinyl chloride - butylacrylate copolymer
 methylmethacrylate - ethylacrylate copolymer
 styrene - ethyl acrylate copolymer
 vinyl chloride-2-ethylhexyl acrylate copolymer
 vinyl acetate - dioctyl fumarate copolymer
 acrylonitrile - butadiene copolymer
 vinyl acetate - diethyl maleate copolymer When reference is made to the term alkyl, lower alkyl is preferred, i.e., alkyl containing from one to four carbon atoms.

The polymers are usually added to the herein disclosed composition in emulsion form. Hence, the water in the polymer emulsion will go to make up partially or all of the volatile components content of 8–20 percent by weight.

When a polyhydric alcohol is included, that material shall provide a portion of the volatile component content. That is to say, the aforesaid alcohols are considered as volatile components as defined herein. It is further understood that if a polyhydric alcohol is included, the calculation of the aforesaid range of 8–20 percent is based on the amount of water and alcohol (if any).

Generally, the water resistant polymer emulsions useful in the present invention may be characterized as those emulsions which when admixed with a filler having the physical characteristics herein set forth results in a composition having a viscosity of 50,000 to 1,200,000 cps. and a water retention value of 10 to 40.

The filler employed in the present invention should have an average particle size not greater than 100 mesh and may range in average size from 100 mesh to 20 microns. It is preferred to employ a filler having an average particle size between 200 and 400 mesh (64 to 37 microns).

In addition, the filler when measured as an aqueous slurry having a water to filler volume ratio not greater than about 1 and having a viscosity of from about 400,000 to 500,000 cps., should have a flow not greater than 120 percent.

Lastly, the filler should be water wettable, relatively nonabsorbant, nongel forming and have a pH which is compatible with the particular water resistant polymer emulsion employed.

Illustrative of the fillers which may be employed are limestone, barytes, fine silica, wollastonite, mica, flint powder, quartz, kryolite, glass, alumina trihydrate, talc, pyrophyllite, zinc oxide and mixtures of same. As employed in the instant application, the word filler shall be defined to also include a mixture of filler materials since, while a particular filler may not meet the physical parameters hereinabove set forth, a mixture of such filler in combination with another filler may satisfy such parameters and be employed in the composition of the present invention, as for example, titanium dioxide pigment alone is unacceptable as a filler; however, a composition comprising 98 percent limestone and 8 percent titanium dioxide has been found to be acceptable.

The viscosity measurements disclosed herein were determined at room temperature by employing a Brookfield Helipath viscometer using a Helipath Spindle E. Whereas, flow is measured by employing the procedure for Portland cement mortar in ASTM C-109, Determination of Flow, with the exception that the mold described in ASTM-230 is replaced by a smaller, truncated cone mold having the following inside dimensions; bottom inside diameter, 2.75 inches; top side diameter, 2.375 inches and height, 1.562.

In addition to overcoming the inherent shortcomings of conventional Portland cement grouting compositions, the grouting composition of the present invention may also be employed as an adhesive, as for example, in bonding a dry tile to another or to a dry substrate such as gypsum, wallboard, cement asbestos board, gypsum plaster, Portland cement plaster or concrete masonry. Furthermore, the grouting compositions of the present invention have demonstrated a utility in a temperature range of −7 to 50° C.

By the term "method of grouting tile," is meant the art recognized procedure for setting and grouting tile. The compositions of this invention are particularly adapted for use as trowellable grouts or mortars to set ceramic tiles and to fill the joints between the tiles. They bond exceedingly well to the ceramic tile edges and to the backs of ceramic tile. In grouting, an assembly containing a plurality of ceramic tile in edge to edge relationship with spaces between the tiles is prepared and the spaces between the tile filled with the compositions of this invention. When used to set and grout ceramic tile, the compositions form a hard, adherent, chemically resistant bond between the backs of said ceramic tile and the substrate.

Normal grouting comprises the steps of:

1. trowelling the grout on the wall and into the joints between the tiles;
2. washing excess material from the tile faces;
3. (optional) tooling the joints to obtain the final general contour desired;
4. rewashing the wall and shaping the joints as desired with a sponge or similar soft pad; and
5. wiping the tile clean with a dry cloth or similar material after the remaining residue dries on the tile face.

In preparing the novel grouting composition of the present invention, additional materials may be added to the composition such as coloring materials, stabilizers, foam breakers, dispersants, surfactants, emulsifiers and the like.

As an additional embodiment of the invention, applicants have found that the addition of materials such as polyhydric alcohols including ethylene glycol, hexylene glycol, glycerin, propylene, glycol, hexitols, sorbitol and mannitol among others, as well as sodium ethyl phosphate, invert sugar and substituted ureas among others, aid in retarding film formation. Therefore, the ease of cleaning excess grouting material from the tile surface is materially enhanced. Such materials may be employed in concentrations ranging from 5 to 30 percent by weight of the water resistant polymer emulsion. It is preferred to employ a concentration of from about 10 to 25 percent.

Additional additives which aid in the coalescence of the composition and thereby yield cured products exhibiting improved stain resistance and toughness as well as water resistance may be incorporated. Illustrative of such additives are butoxyethyl acetate, ethoxyethyl acetate, butoxy ethoxyethyl acetate, toluene, xylene and the like.

Lastly, additives which control thixotrophy and viscosity characteristics may also be incorporated in the composition. Illustrative of such additives are methyl cellulose, hydroxyethyl cellulose, carboxymethyl hydroxy ethyl cellulose, animal glues, various starches, aliginates, polyvinyl alcohol and proteins among others.

Illustrative of coloring materials which may be incorporated in the composition are titanium dioxide, cadmium red, carbon black, aluminum powder and the like.

A preferred grouting composition has a viscosity of 100,000 to 300,000 cps., a water retention value below 30 and a solids content above 80 percent.

The following examples are provided for illustrative purposes and may include particular features of the invention. However, the examples should not be construed as limiting the invention, many variations of which are possible without departing from the spirit or scope thereof.

EXAMPLE I

Preparation

The following composition was prepared which has a viscosity of 104,000 cps., a water retentivity of 19.4, a solids content of 83.6 percent and a volatile components content of 16.4 percent.

| | | |
|---|---|---|
| Ground Limestone (Mean particle diameter of 5 microns) | 206.7 | grams |
| Aluminum Trihydrate (Mean particle diameter of 0.9 microns) | 20 | grams |
| Aluminum Trihydrate (Mean particle diameter of 30 microns) | 37.5 | grams |
| Aluminum Trihydrate (Mean particle diameter of 80 microns) | 471.5 | grams |
| Titanium Dioxide | 20 | grams |
| AC-33 Acrylic Emulsion by Rohm & Haas 46% solids* | 194 | grams |
| Ethylene Glycol | 30.30 | grams |
| Distilled Water | 21.5 | grams |
| N, N, N′, N′,-tetrakis (2-hydroxypropyl) ethylene diamine | 4.2 | grams |
| Colloid 513DD Antifoaming Agent** | 1 | gram |

*The AC-33 Acrylic Emulsion supplied by Rohm & Haas is defined as an acrylic emulsion copolymer based on a major amount of ethyl acrylate and a minor amount of methyl methacrylate in proportions to provide a glass transition temperature of 12°C.
**The Colloid 513DD Antifoaming Agent supplied by Colloids Inc. is defined as a blend of hydrocarbons and polyglycol-glycol ester combinations supported on an inert carrier.

The above filler combination complies with water

Water Retentivity Test Procedure

This example demonstrates the apparatus and procedure employed in determining the water retention value of grouting compositions:

Apparatus:

a. Microscope: A standard unocular model microscope is employed in which the mechanical table and substage condenser have been removed. The microscope should be equipped with an eyepiece lens of 10X magnification and selective objective lenses of 3.5X, 10X and 43X magnifications. The fine adjustment button on the lens barrel should be calibrated so that a count equal or equivalent to one micron may be read.
b. Illumination: A microscope illuminator capable of focusing a beam of light about 1 square centimeter in area from a 16 watt light bulb should be employed in conjunction with the microscope.
c. Timer: A stopwatch, laboratory timer, or equivalent capable of reading minutes and seconds.
d. Glass Slide: Transparent glass microscope slide measuring 5.08 centimeters square and 0.15 centimeters thick.
e. Straightedge: A rigid steel strip, approximately 10 centimeters long and 2 centimeters wide, with smooth lower edge.
f. Spatula: a 3 inch long steel-bladed spatula, with handle.
g. Screeding Form: A steel or brass screeding form.
h. Tile: A section 5.08 centimeters square, cut from a standard Department of Commerce Standard 181-52 test tile.
i. Tile Cutter: A dry-type ceramic-tile cutter.

Procedure:

This procedure is carried out at a relative humidity of 50 percent and a temperature of from about 70 to 75°F. Place the screeding form over the unglazed side of the tile section. At the end of a 30 minutes slaking period, load the grout composition onto the center of the section of the straightedge and draw it across the unglazed surface of the tile section contained within the screeding form to obtain 3.2 mm thick layer of grout. Start the movement of the straightedge from the open side of the screeding form, and at the completion of screeding, remove the screeding form, from the tile and trim away any mortar extending beyond the tile edges. Press a glass slide onto the exposed grout surface. Record that instant as "zero time" when the grout was first brought into contact with the tile. Place the assembly on the microscope table and focus on a point located on the top surface near the center of the glass slide; generally, an abrasion or other small marking. Lower magnifications may be used for initial alignment, but final focusing should be with the 43X objective lens. At 2 minutes from zero time, note and record as "zero displacement," the reading obtained on the fine adjustment micrometer of the microscope with the point on the glass slide in focus.

Readings of the micrometer with the same point on the glass slide in focus will be recorded at 3, <u>4</u>, <u>5</u>, <u>6</u>, <u>7</u>, <u>8</u>, 9, <u>10</u>, 11, <u>12</u>, 15, 19, 21 and 25 minutes.

Note: Straight line is usually defined by those points at times underlined above.

Determination of Water Retention Value:
a. A plot is made of displacement ($w$) as determined above, in microns measured from "zero displacement" versus the square root of time ($t$ one-half) as determined above, in minutes measured from "zero time."
b. A straight line is drawn visually through those points lying on such straight line.
c. The measured slope of this line, in these units, is equal to the "K value" for the grout under test.
d. The parameter, R, which is termed the Index of Water Retentivity or the Water Retention Value is determined according to the equation: $R = 1000/K$.

EXAMPLE II

Preparation of the Novel Grouting Composition

This example demonstrates the preparation of the novel grouting composition of the present invention.

An acrylic emulsion, 46 percent solids in water purchased under the trade name Rhoplex AC-33 was used in conjunction with fine ground limestone, averaging 75 microns in particle size, to prepare a thick slurry or paste.

To 100 weight parts of the emulsion was added 275 weight parts of the ground limestone. The two materials were physically mixed to a smooth lump free consistency which was trowelable and which did not separate. The mixture remained in this condition for a prolonged period of time in a closed container, had a room temperature viscosity of 410,000 cps., a water retentivity of 24.4, and a solids content of 85.5 percent.

When applied to the joints of adhered absorptive wall tile, the loss of water to the tile and to the air caused coalescence of the emulsified acrylic polymer, resulting in a hard polymer-filler composite possessing relatively good stain resistant, flexible, crack-free and non-powdering properties.

EXAMPLE III

Preparation of the Novel Grouting Composition

This example demonstrates the utilization of particular hydrophilic compounds in the grouting composition of the present invention.

The incorporation of materials such as ethylene glycol, glycerine, triethylen glycol and sorbitol in sufficient quantities extends the drying times and aids in working times and in reducing the effort required to clean excess grouting compositions from the face of ceramic wall tiles and at the same time does not detract from the desirable properties of the cured composite.

A basic formulation was compounded to illustrate the effect of the above materials on drying times.

50 weight parts of AC-33 (46 percent solids Acrylic Emulsion of Example 1)
112 weight parts of Limestone (mean particle diameter = 70 microns)
37.5 weight parts of Limestone (mean particle diameter = 5 microns)
50.0 weight parts OR-540 Titanium dioxide (mean particle diameter = 0.2 microns)

To aliquots of this mix was added, 0, 5, 10, 15, 20, 25, 30 and 50 percent increments of the hydrophillic materials based on the liquid emulsion present. Viscosities of the mixtures ranged from 350,000 to 700,000 cps. These mixtures then were applied to the glazed face of ceramic wall tiles and the time to film formation or difficult removal, measured.

The results of the test demonstrated that the range of 7.5 to 30 percent addition gives an effective increase of non-film formation allowing the required time for clean-up and joint shaping necessary in the art of tile grouting. A preferred range of addition was 8 to 25 percent.

EXAMPLE IV

Preparation of the Novel Grouting Composition

This example demonstrates the preparation of the novel grouting composition of the present invention.

A paste was prepared by simple hand mixing according to the following formation:

| | |
|---|---|
| 100 weight parts | Acrylic Emulsion MC-4530 (Rohm & Haas) |
| 1 weight part | Ammonium Hydroxide (28% in water) |
| 275 weight parts | Fine Limestone (−325 mesh) |
| 10 weight parts | Titanium Dioxide (Rutile) |
| 5 weight parts | Tri normal butyl phosphate |

The acrylic emulsion MC-4530 is a water dispersion specifically designed for modifying Portland cement compositions. It is a milky white opaque dispersion having a 45 percent acrylic polymer solids concentration and a pH of 9.4 to 9.9. Clean films cast from this emulsion display excellent retention of flexibility, film clarity, resistance to ultra violet light, heat, excellent abrasion resistance and water resistance.

A smooth workable mix was prepared which was trowelable to fill the spaces between absorptive ceramic wall tiles. It had a room temperature viscosity of 204,000 cps., and a water retentivity of 19.2. The material left on the face of the ceramic wall tiles by the troweling operation was removable by means of water and scrubbing.

The resultant filled and cleaned joints were smooth, free of cracks, were tough and relatively stain resistant. No gross porosity was noted as might be seen where a Portland cement grout could dry to the surrounding as did this formula. Further, no crumbling or cracking resulted and the joints were not damaged by physical contact with cleaning implements and solutions.

EXAMPLE V

Stain Resistance

The present example demonstrates the use of additives to enhance stain resisting properties of the grouting compositions.

The basic formulation was compounded as follows:

| | |
|---|---|
| Rhoplex AC-33 | 250 grams |
| Ethylene Glycol | 25 grams |
| Limestone (70 micron) | 610 grams |
| Limestone (5 micron) | 215 grams |
| TiO$_2$ (OR-540) (0.2 micron) | 145 grams |

To 100 gram aliquots of this were added:
A. 2 grams Yellow Parmo
B. 4 grams Yellow Parmo
C. 6 grams Yellow Parmo
D. 8 grams Yellow Parmo
E. 2 grams Silicone Jelly
F. 4 grams Silicone Jelly
G. 6 grams Silicone Jelly
H. 8 grams Silicone Jelly
I. Control — no additives.

Yellow Parmo is petroleum jelly having an ASTM congealing point: 112/122°F, ASTM Consistency: 160/220°, and Saybolt melting point: 115/125°F.

The viscosities of the compositions were between 250,000 and 300,000 cps., retentivity, R, equaled approximately 23.

Silicone jelly is a mold release silicone jelly having a consistency similar to that above.

Coatings were applied to the absorptive surface of ceramic wall tile thus simulating a grout joint but affording a larger surface for staining tests.

When cured 7 days the coatings were subjected to mustard, ink and black coffee. Each was applied as a droplet that was allowed to dry on the surface for at least 10 minutes. At that time the coatings were rinsed with water with rubbing.
A. Left definite stain marks — not removable.
B. Left definite stain marks — not removable.
C. Coffee removable — ink and mustard significantly lightened.
D. coffee removable — ink and mustard significantly lightened.
E. Left definite stain marks — not removable.
F. Left definite stain marks — not removable.
G. Coffee removable — ink and mustard significantly lightened.
H. Coffee removable — ink and mustard significantly lightened.
I. Deep staining — not removable.

The above coatings were then cleaned with an abrasive cleaner and water.
A. Coffee and mustard removable — ink remains.
B. Coffee and mustard removable — ink remains.
C. Coffee and mustard removable — ink significantly reduced.
D. Coffee and mustard removable — ink signficantly reduced.
E. Coffee and mustard removable — ink remains.
F. Coffee and mustard removable — ink remains.
G. Coffee and mustard removable — ink reduced.
H. Coffee and mustard removable — ink reduced.
I. All stains not removable — coffee significantly lightened.

EXAMPLE VI

Acceptable Fillers

The inventors have found that the selection of insoluble fillers for use in this invention, which includes pigments, is not in simple accord with usual rules applied to selection of insoluble accord fillers for paints and caulks. Therefore, the inventors have evolved a test method for fillers and filler compositions which can be applied to any organic or inorganic filler or filler combination to indicate its usefulness as a filler to achieve the grout of this invention in combination with emulsion and special additives.

This method of test for fillers and filler combinations is designed to classify fillers as suitable or not suitable for use in the grout of this invention. It does not give information as to amounts of fillers required in the grout of this invention, only a rapid means of discriminating among fillers and filler combinations which will make a grout satisfying this invention.

The method of test is:
First the filler or filler combination must pass the following physical requirements:
1. Average particle size less than about 100 mesh.
2. The pH of a dispersion in water equals 7 or is acidic or basic as required to be compatible with the emulsion for which it is being considered.
3. A water slurry mixed to Brookfield, Spindle E, Helipath viscosity of between 400,000 and 500,000 cps., shall have a flow not greater than approximately 120 percent and a water:filler volume ratio not greater than about 1.

The flow is measured according to procedure for Portland cement mortar, ASTM C-109 — Determination of Flow, except that the mold described in ASTM C-230 is replaced by a smaller, truncated cone mold of the following inside dimensions: bottom inside diameter = 2.750 inches, top side diameter = 2.375 inches, height = 1.562.

The following table illustrates the results achieved with particular fillers:

| Butadiene-styrene copolymer aq. emulsion* | 14.12 grams |
|---|---|
| Water | 2.83 |
| Potassium tripolyphosphate | .07 |
| Surfactant | .07 |
| Antifoaming agent | .28 |
| Limestone powder (5 micron particles size) | 14.12 |
| Limestone fines (−100 mesh) | 68.50 |

* A commercially available material manufactured and sold by Dow Chemical Co. under the trade name Dow-460.

TABLE I.—FILLER EVALUATION DATA

| Test No. | Filler and source | Water/filler volume ratio | Modified ASTM flow, percent | Evaluation | Sp. gr. of filler | Brookfield helipath viscosity, spindle E | Ml. of H₂O per 100 gms. filler |
|---|---|---|---|---|---|---|---|
| 1 | 4-A limestone, R. E. Carroll, Inc. | .71 | 109 | Accept | 2.8 | 482,000 | 25.5 |
| 2 | G-200 pottery feldspar, The Feldspar Corp. | .732 / .724 | 220 / 86 | Do not accept | 2.56 | 10,000 / 1,000,000 | 28.6 / 28.3 |
| 3 | Mixture: 75% #1 and 25% #8 | .74 | 115 | Accept | 2.8 | 422,000 | 26.5 |
| 4 | Mixture: 69% #1, 23% #8 and 8% #11 | .75 | 103 | do | 2.9 | 421,000 | 26.0 |
| 5 | RH-31 alumina trihydrate, Reynolds Metal Company | .93 | 34.5 | do | 2.4 | 416,000 | 39.0 |
| 6 | Mixture: 75% #1 and 25% #9 | .94 | 98 | do | 2.8 | 488,000 | 33.5 |
| 7 | Mixture: 75% #1 and 25% #13 | .96 | 86 | do | 2.7 | 466,000 | 35.5 |
| 8 | Snowflake white limestone, Thompson Weinman & Company | .98 | 92 | do | 2.8 | 404,000 | 35.0 |
| 9 | LOR talc, Internat. Talc Company, Inc. | 1.36 | 86 | Do not accept | 2.7 | 462,000 | 50.5 |
| 10 | Cab-O-lite P-1 wallastonite, Cabot Corporation | 1.44 | 104 | do | 2.9 | 450,000 | 49.5 |
| 11 | OR-540 titanium dioxide, American Cyanamid Co. | 1.89 | 66 | do | 4.2 | 470,000 | 45.0 |
| 12 | Blanc Fixe, Standard Ultramarine & Color Co. | 2.57 | 86 | do | 4.6 | 466,000 | 56.0 |
| 13 | Sample #67-442 experimental ground alumina trihydrate, Reynolds Metal Co. | 2.64 | 69 | do | 2.4 | 485,000 | 110.0 |
| 14 | No. 42 zinc oxide, St. Joseph Lead Company | 6.75 | 75 | do | 5.6 | 480,000 | 120.0 |

EXAMPLE VII

The following composition is prepared to form a suitable grout having a viscosity of 100,000 cps.

| Polyvinyl chloride-acrylic copolymer aq. emulsion* | 1400.0 grams |
|---|---|
| Water | 155.4 |
| Ethylene glycol | 219.1 |
| Potassium tripolyphosphate | 7.0 |
| Asbestos floats (thixotrophic aid) | 54.6 |
| Surfactant (Tamol 731 Rohm and Haas) | 70.0 |
| Antifoaming Agent | 8.4 |
| TiO₂ (0.5 micron particle size) | 226.9 |
| Ground silica (−325 mesh) | 1530.9 |
| Limestone powder (5 micron particle size) | 1402.8 |
| Alumina trihydrate (−100 mesh) | 1992.2 |
| Fungicide | 12.6 |

* commercially available from B. F. Goodrich Company under the trade name GEON 450 × 20.

EXAMPLE VIII

The procedure of Example VI is repeated to prepare a similar composition except a vinylidene chloride copolymer aq. emulsion (GEON 652— trade name for product sold commercially by B. F. Goodrich Co) is used in place of the polyvinyl chloride-acrylic copolymer. The resulting composition has a viscosity of 350,000 cps. and provides a suitable grout.

EXAMPLE IX

The procedure of Example VI is repeated to prepare a similar composition except an acrylate copolymer aq. emulsion AC-490 (trade name for a commercially available material sold by Rohm and Haas) is used in place of the polyvinyl chloride-acrylic copolymer. The resulting composition has a viscosity of 172,000 cps. and provides a suitable grout.

EXAMPLE X

The following composition is prepared:

The resulting composition, after mixing, has a viscosity of 188,000 cps. and provides a suitable grouting composition. The water content (volatile component) is approximately 10%.

EXAMPLE XI

The following composition is prepared:

| Acrylic aq. emulsion (AC-33) | 20.03 grams |
|---|---|
| Ethylene glycol | 2.82 |
| TiO₂ | 3.17 |
| Potassium tripolyphosphate | 0.10 |
| Antifoaming agent | 0.12 |
| Limestone (5 micron particle size) | 19.50 |
| Silica (−325 mesh) | 21.30 |
| Thickener (Carbopol 934) | 0.01 |
| Alumina trihydrate | 27.72 |
| Silica sand (44–74 micron particles size) | 5.00 |
| Phenylmercurial fungicide | 0.23 |

After mixing, the grout has a viscosity of 200,000 cps. and serves as a highly effective grout. The volatile component content (water and ethylene glycol) is approximately 14 percent.

EXAMPLE XII

The procedure of Example I is repeated except the following polymeric aqueous emulsions in equivalent amounts are used instead of AC-33:

styrene-diethylmaleate copolymer
styrene-dimethylmaleate copolymer
vinylchloride-ethylacrylate copolymer
vinylchloride-butylacrylate copolymer
methylmethacrylate-ethylacrylate copolymer
styrene-ethyl acrylate copolymer
vinylchloride-2-ethylhexyl acrylate copolymer
vinylacetate-dioctyl fumarate copolymer
acrylonitrile-butadiene copolymer
vinyl acetate-diethyl maleate copolymer Effective grouting compositions are obtained in each instance.

Although the invention has been described and illustrated by reference to particular embodiments thereof, it will be understood that in its broadest aspects the invention is not limited to such embodiments and that variation and substitution of such equivalents may be resorted to within the scope of the appended claims.

What is claimed is:

1. A non-hydraulic grouting composition which comprises a water resistant polymer emulsion having a solids content of at least 40 percent by weight obtained from monomers selected from the group consisting of maleic anhydride, acrylic acid, methacrylic acid, vinyl acetate, vinyl chloride, vinyl alcohol, acrylonitrile, vinylidene chloride, styrene, butadiene, alkyl acrylates, alkyl methacrylates, alkyl maleates, alkyl fumarates and mixtures thereof and a non-hydraulic water insoluble filler having an average article size not greater than 100 mesh nor less than 20 microns, which when measured as an aqueous slurry, at a viscosity of between 400,000 and 500,000 cps, has a water to filler volume ratio not greater than 1 and a flow not greater than 120 percent; the resulting composition having a viscosity of 50,000 to 1,200,000 cps, a water retention value of 10 to 40, a filler content of from about 75 percent to 88 percent by weight and an aqueous volatile component content of from 8 percent to 20 percent by weight.

2. The composition according to claim 1 wherein said volatile component consists essentially of water.

3. The composition according to claim 1 wherein the filler is limestone.

4. The composition according to claim 1 wherein the water resistant polymer emulsion comprises a copolymer consisting of a major amount of ethyl acrylate and a minor amount of methyl methacrylate in proportions sufficient to provide a glass transition temperature of 12° C.

5. The composition according to claim 1 comprising 5 to 30 percent by weight of the water resistant polymer emulsion of a polyhydric alcohol.

6. The composition according to claim 5 comprising 10 to 25 percent by the polyhydric alcohol.

7. The composition according to claim 5 in which the polyhydric alcohol is ethylene glycol.

8. The composition according to claim 1 having a viscosity of from about 100,000 to 300,000 cps., a water retention value below 30, a filler content above 80 percent and a volatile component content greater than 10 percent.

* * * * *

PO-1050
(5/6)

UNITED STATES PATENT OFFICE
CERTIFICATE OF CORRECTION

Patent No. 3,706,696        Dated   December 19, 1972

Inventor(s)  Frank E. Bernett and Robert J. Kleinhans

It is certified that error appears in the above-identified patent and that said Letters Patent are hereby corrected as shown below:

In column 6, line 54 text is missing. It should continue as follows after "water" -- to filler ratio and flow requirements when the viscosity of an aqueous slurry is between 400,000 and 500,000 cps. Typical acceptable fillers and combinations are defined in Example VI. --

In column 10, line 42, after "insoluble" delete -- accord --.

In claim 1, line 15, change "article" to -- particle.-- .

Signed and sealed this 1st day of January 1974.

(SEAL)
Attest:

EDWARD M. FLETCHER, JR.            RENE D. TEGTMEYER
Attesting Officer                  Acting Commissioner of Patents